US012235448B2

(12) United States Patent
Son et al.

(10) Patent No.: US 12,235,448 B2
(45) Date of Patent: Feb. 25, 2025

(54) HEAD MOUNTED DISPLAY (71) Applicant: LG Chem, Ltd., Seoul (KR)

(72) Inventors: Hyun Joo Son, Daejeon (KR); Dae Han Seo, Daejeon (KR); Bu Gon Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 619 days.

(21) Appl. No.: 17/601,803

(22) PCT Filed: Sep. 3, 2020

(86) PCT No.: PCT/KR2020/011815
§ 371 (c)(1),
(2) Date: Oct. 6, 2021

(87) PCT Pub. No.: WO2021/066335
PCT Pub. Date: Apr. 8, 2021

(65) Prior Publication Data
US 2022/0179218 A1    Jun. 9, 2022

(30) Foreign Application Priority Data

Sep. 30, 2019 (KR) .................. 10-2019-0121202

(51) Int. Cl.
*G02B 27/01* (2006.01)
*G02C 11/00* (2006.01)
*G06T 7/70* (2017.01)

(52) U.S. Cl.
CPC ..... *G02B 27/0172* (2013.01); *G02B 27/0179* (2013.01); *G02C 11/10* (2013.01);
(Continued)

(58) Field of Classification Search
None
See application file for complete search history.

(56) References Cited

U.S. PATENT DOCUMENTS

| 2002/0135830 A1 | 9/2002 | Endo et al. |
| 2004/0004586 A1 | 1/2004 | Endo et al. |

(Continued)

FOREIGN PATENT DOCUMENTS

| CN | 103261943 A | 8/2013 |
| CN | 108700751 A | 10/2018 |

(Continued)

OTHER PUBLICATIONS

International Search Report for Application No. PCT/KR2020/011815, mailing Dec. 11, 2020, 2 pages.

(Continued)

*Primary Examiner* — Bao-Luan Q Le
*Assistant Examiner* — Danell L Owens
(74) *Attorney, Agent, or Firm* — Lerner David LLP (57) ABSTRACT

Disclosed is a head mounted display which can secure an eye motion box having a certain level by implementing an image using a holographic optical element, the eye motion box being an area where a wearer can visually recognize the image, extend the field of view (FOV) of the wearer by disposing a lens (imaging lens) on an optical path between a display source and the holographic optical element, and secure an eye motion box having a certain level and extend the field of view (FOV) of the wearer by adjusting the positions of the display source and the lens.

12 Claims, 4 Drawing Sheets

(52) U.S. Cl.
CPC ........ *G06T 7/70* (2017.01); *G02B 2027/0134* (2013.01); *G02B 2027/014* (2013.01); *G02B 2027/0174* (2013.01); *G02B 2027/0178* (2013.01)

(56) References Cited

U.S. PATENT DOCUMENTS

| | | |
|---|---|---|
| 2009/0316115 A1 | 12/2009 | Toh et al. |
| 2013/0009853 A1 | 1/2013 | Hesselink et al. |
| 2015/0212326 A1 | 7/2015 | Kress et al. |
| 2015/0237336 A1 | 8/2015 | Sylvan et al. |
| 2015/0279114 A1 | 10/2015 | Yonekubo |
| 2015/0293357 A1 | 10/2015 | Shin et al. |
| 2016/0147081 A1* | 5/2016 | Kilcher ................ G02B 26/101 359/13 |
| 2016/0150201 A1 | 5/2016 | Kilcher et al. |
| 2016/0323567 A1 | 11/2016 | Matson et al. |
| 2017/0255013 A1 | 9/2017 | Tam et al. |
| 2018/0045902 A1 | 2/2018 | Lee et al. |
| 2018/0067326 A1 | 3/2018 | Yonekubo et al. |
| 2018/0095279 A1 | 4/2018 | Bouchier et al. |
| 2018/0373327 A1 | 12/2018 | Todeschini |
| 2019/0041666 A1* | 2/2019 | Abele ..................... G02B 27/00 |
| 2019/0049732 A1 | 2/2019 | Lee et al. |
| 2019/0146223 A1 | 5/2019 | Li |
| 2019/0187482 A1* | 6/2019 | Lanman ............... G02B 26/105 |
| 2021/0055563 A1 | 2/2021 | Bouchier et al. |

FOREIGN PATENT DOCUMENTS

| | | |
|---|---|---|
| EP | 2889668 A1 | 7/2015 |
| JP | H10319240 A | 12/1998 |
| JP | H11258692 A | 9/1999 |
| JP | 2000214408 A | 8/2000 |
| JP | 2002277816 A | 9/2002 |
| JP | 2004038012 A | 2/2004 |
| JP | 2006209144 A | 8/2006 |
| JP | 2009258686 A | 11/2009 |
| JP | 2016038484 A | 3/2016 |
| JP | 2016166931 A | 9/2016 |
| JP | 2016170203 A | 9/2016 |
| JP | 2017538145 A | 12/2017 |
| JP | 2018523321 A | 8/2018 |
| JP | 2018525662 A | 9/2018 |
| JP | 6413291 B2 | 10/2018 |
| KR | 20140049863 A | 4/2014 |
| KR | 20160104353 A | 9/2016 |
| KR | 20190016869 A | 2/2019 |
| KR | 101969353 B1 | 4/2019 |
| WO | 2018027071 A1 | 2/2018 |

OTHER PUBLICATIONS

Extended European Search Report including Written Opinion for Application No. 20871894.0 dated May 3, 2022, pp. 1-9.
Search Report dated Dec. 8, 2022 from the Office Action for Chinese Application No. 202080023009.8 issued Dec. 13, 2022, pp. 1-2. [See p. 1, categorizing the cited references].
European Office Action for Application No. 20871894.0 dated Feb. 16, 2024, pp. 1-7.

* cited by examiner

HEAD MOUNTED DISPLAY

This application is a national phase entry under 35 U.S.C. § 371 of International Patent Application No. PCT/KR2020/011815, filed on Sep. 3, 2020, which claims priority to Korean Patent Application No. 10-2019-0121202, filed on Sep. 30, 2019, published in Korean, the entire contents of which are incorporated by reference herein.

TECHNICAL FIELD

The present invention relates to a head mounted display, and particularly, to a head mounted display that is worn on the head of a wearer to transfer an image, and is capable of extending a field of view by condensing light outputted from a display source with a lens and adjusting the position of the lens or the display source on the basis of body information of the wearer.

BACKGROUND ART

Recently, with an increase in demands for display devices that implement augmented reality (AR), mixed reality (MR), or virtual reality (VR), there have been developed display devices that magnifies an image, which is outputted from a small image display element, by using an optical system and allows a wearer to see a resultant virtual image with his/her eyes, thereby providing an effect that the wearer feels as if the wearer sees an image through a large screen at a certain distance. Furthermore, since most of these display devices are worn on the head of the wearer in the same way as eyeglasses, they are called head mounted display (HMD) devices.

Optical systems for implementing such a head mounted display include a see-through method in which an image is implemented with an external view being visible and a see-closed method in which an external view is not visible. Among them, a see-through type head mounted display device allows a wearer to be able to see the external view and a display image at the same time. Therefore, the wearer has no problem with performing daily activities with the head mounted display worn and the head mounted display can be variously applied to IoT, navigation, and the like.

The see-through type head mounted display device may include an optical system including a display element and a plurality of optical components for transferring display light, which is output from the display element, to wearer's eyes. Since the head mounted display device needs to be mounted on the head of a wearer, the optical components used in the device may be limited in weight and space. In order to solve such a problem, a head mounted display device using a diffracted optical element (DOE) or a holographic optical element (HOE) has been studied.

The background art described above is technology information, which has been possessed by the present inventors for deriving embodiments of the present invention or acquired in the process of deriving the embodiments of the present invention, and it may not be necessarily said that the background art is a publicly-known technology disclosed to the general public prior to the filing of the application for the embodiments of the present invention.

DISCLOSURE

Technical Problem

When the diffracted optical element is used in the head mounted display, image crosstalk may occur due to low color separation efficiency. When the diffracted optical element or the holographic optical element is used in the head mounted display, if an optical guide is additionally used, light loss may increase.

Embodiments of the present invention intend to provide a head mounted display which can secure an eye motion box having a certain level, by implementing an image using a holographic optical element, the eye motion box which is an area where a wearer can visually recognize the image, and extend the field of view (FOV) of the wearer by disposing a lens (imaging lens) on an optical path between a display source and the holographic optical element.

In addition, embodiments of the present invention intend to provide a head mounted display which can secure an eye motion box having a certain level and extend the field of view (FOV) of the wearer by adjusting the positions of the display source and the lens.

Problems to be solved by the present invention are not limited to the aforementioned problems, and the other unmentioned problems will be clearly understood by those skilled in the art from the following description.

Technical Solution

An embodiment of the present invention provides a head mounted display, which is worn on a head of a wearer to transfer an image, the head mounted display including: a display source disposed on a lateral side of an eye of the wearer and configured to output image display light; a first lens configured to condense the image display light; a holographic optical element (HOE) disposed in front of the eye of the wearer and configured to direct the image display light passing through the first lens toward the eye of the wearer; and a controller configured to adjust a position of at least one of the display source and the first lens.

According to an embodiment of the present invention, the controller may include: a sensor unit disposed in front of the eye of the wearer and configured to acquire body information of the wearer; a control unit configured to calculate predetermined positions of the first lens and the display source on the basis of the acquired body information; and an operation unit disposed on the lateral side of the eye of the wearer and configured to move the positions of the first lens and the display source to the predetermined positions.

According to an embodiment of the present invention, the display source may include a liquid crystal display panel or an organic light emitting diode display panel.

According to an embodiment of the present invention, the head mounted display may further include a second lens disposed in front of the eye of the wearer and having the holographic optical element formed on one surface thereof.

According to an embodiment of the present invention, external light may pass through at least one of the second lens and the holographic optical element, and may be incident onto an eye of the wearer from a surface facing the eye side of the wearer.

According to an embodiment of the present invention, the display source, the first lens, the second lens, and the controller may be installed on at least one of eyeglasses, goggles, and a helmet.

According to an embodiment of the present invention, a pair of left and right display sources may be provided to correspond to both eyes of the wearer, respectively, a pair of left and right first lenses may be provided to correspond to both eyes of the wearer, respectively, a pair of left and right second lenses may be provided to correspond to both eyes of the wearer, respectively, and a pair of left and right controllers may be provided to correspond to both eyes of the wearer, respectively.

According to an embodiment of the present invention, the display source and the first lens may be disposed inside an eyeglass temple so that image display light from the display source is obliquely incident at a predetermined angle with respect to a normal line of the holographic optical element.

According to an embodiment of the present invention, the first lens may have a focal length calculated to satisfy a target field of view of the eye of the wearer for the image.

According to an embodiment of the present invention, a focal length calculated to satisfy the target field of view of the eye of the wearer for the image may be recorded on the holographic optical element.

According to an embodiment of the present invention, the sensor unit may be located inside an eyeglass frame, and the control unit and the operation unit may be located inside the eyeglass temple.

According to an embodiment of the present invention, the body information may be one selected from the group consisting of a shape of the head of the wearer, a position of the eye of the wearer, a distance between both eyes of the wearer, and a combination thereof.

According to an embodiment of the present invention, the control unit may calculate the predetermined positions of the first lens and the display source so as to satisfy the target field of view of the eye of the wearer for the image.

Advantageous Effects

The head mounted display according to an embodiment of the present invention may use a holographic optical element and a lens and adjusts the positions of the display source and the lens, thereby securing an eye motion box having a certain level and extending the field of view in which an implemented image can be visually recognized.

The head mounted display according to an embodiment of the present invention can reduce image crosstalk and provide an image with clear color separation by using a holographic optical element.

BEST MODE

The present invention will become apparent by reference to the following detailed description in conjunction with the accompanying drawings. However, the present invention is not limited to such embodiments and may be realized in various forms. The embodiments to be described below are nothing but the ones provided to bring the disclosure of the present invention to perfection and assist those skilled in the art to which the present invention pertains to completely understand the scope of the present invention. The present invention is defined only by the scope of the appended claims.

The terminology used herein is for the purpose of describing embodiments only and is not intended to limit the present invention.

In the present specification, the singular forms are intended to include the plural forms as well, unless the context clearly indicates otherwise. The terms "comprises" and/or "comprising" of stated component, step, operation and/or element, when used herein, do not exclude the presence or addition of one or more other components, steps, operations, and/or elements.

In the present specification, the terms such as first and second may be used to describe various components, but the components are not limited by the terms. The terms are used only to distinguish one component from another component.

An embodiment of the present invention provides a head mounted display, which is worn on a head of a wearer to transfer an image, the head mounted display including: a display source disposed on a lateral side of an eye of the wearer and configured to output image display light; a first lens configured to condense the image display light; a holographic optical element (HOE) disposed in front of the eye of the wearer and configured to direct the image display light passing through the first lens toward the eye of the wearer; and a controller configured to adjust the position of at least one of the display source and the first lens.

The head mounted display according to an embodiment of the present invention can use the holographic optical element and the lens and adjust the positions of the holographic optical element and the lens, thereby securing an eye motion box having a certain level and extend a field of view in which an implemented image can be visually recognized.

Figure 1:
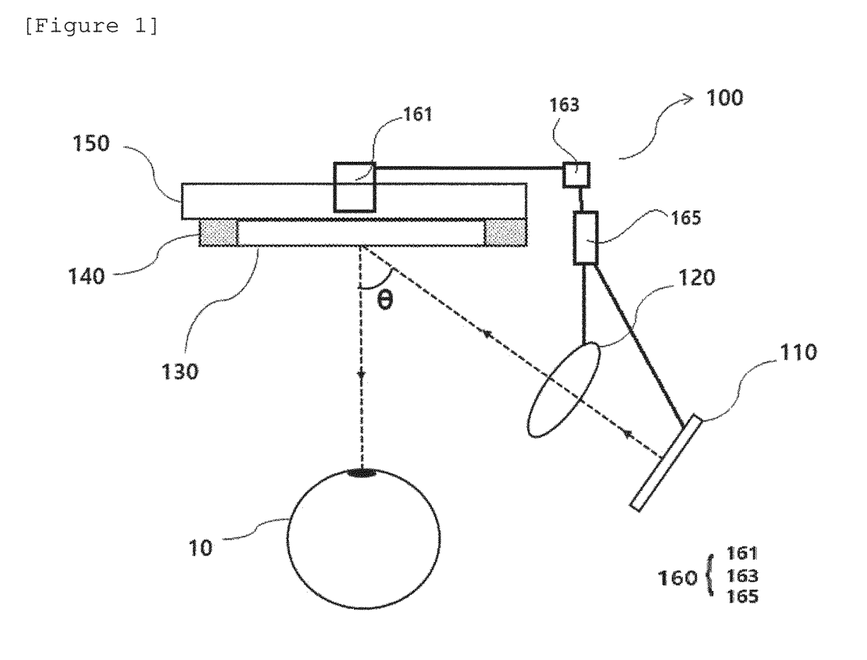
FIG. 1 is a schematic view of a head mounted display according to an embodiment of the present invention.

FIG. 1 is a schematic view of a head mounted display 100 according to an embodiment of the present invention.

According to an embodiment of the present invention, the head mounted display 100 includes a display source 110, a first lens 120, a holographic optical element 130, and a controller 160. Referring to FIG. 1, the head mounted display 100 may be mounted on the head of a wearer, image display light including image information may be output by the display source 110 located on the lateral side of an eye 10 of the wearer, and the output image display light may be directed toward the eye of the wearer by the first lens 120 and the holographic optical element 130. The head mounted display 100 may form a virtual image of the image display light including the image information through the display source 110, the first lens 120, the holographic optical element 130, and the wearer may recognize the virtual image as if the wearer sees an image through a screen at a certain distance. In addition, the controller 160 may adjust the position of at least one of the display source and the first lens 120 in order to extend the field of view of the wearer.

According to an embodiment of the present invention, the controller 160 may adjust the position of at least one of the display source 110 and the first lens 120. As described above, the controller 160 adjusts the position of at least one of the display source 110 and the first lens 120 to adjust a distance L1 (FIG. 4) between the holographic optical element 130 and the first lens 120 and/or a distance L2 (FIG.

Figure 4:
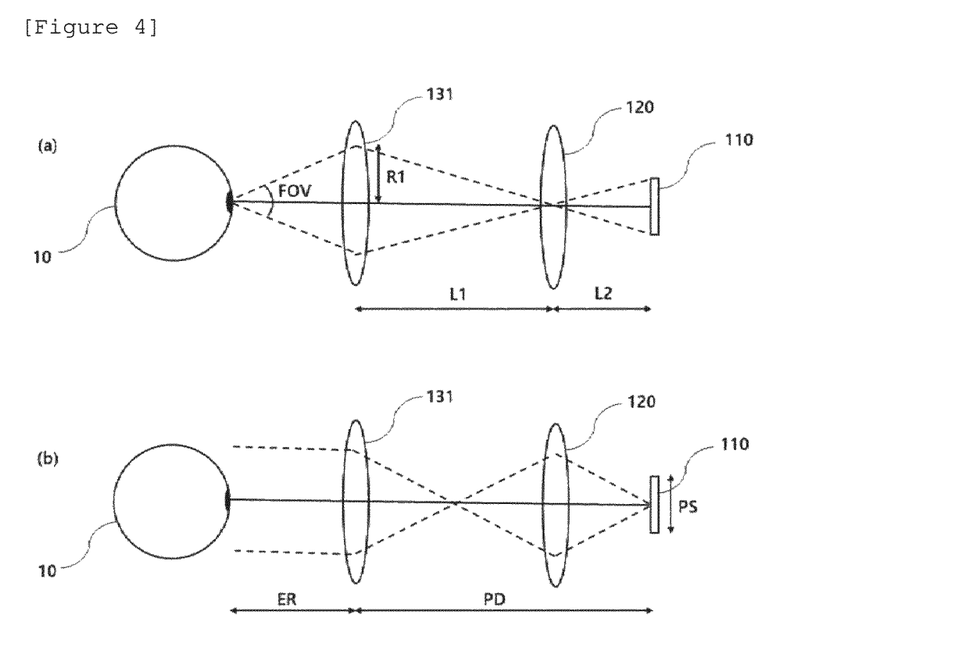
FIG. 4 is a view for explaining a physical structure of components included in head mounted displays according to various embodiments.

4) between the first lens 120 and the display source 110, so that it is possible to maximally secure a field of view on the basis of body information that varies depending on a wearer.

According to an embodiment of the present invention, the controller 160 may include: a sensor unit disposed in front of the eye of the wearer and configured to acquire body information of the wearer; a control unit 163 configured to calculate predetermined positions of the first lens and the display source on the basis of the acquired body information; and an operation unit 165 disposed on the lateral side of the eye of the wearer and configured to move the positions of the first lens and the display source to the predetermined positions. As described above, by adjusting the distance L1 between the holographic optical element 130 and the first lens 120 and/or the distance L2 between the first lens 120 and the display source 110, it is possible to maximally secure the field of view on the basis of body information that varies depending on a wearer.

According to an embodiment of the present invention, the sensor unit 161 may be disposed in front of the eye of the wearer and acquire the body information of the wearer. As described above, since the sensor unit 161 is disposed in the front of the eye of the wearer, it is possible to accurately and easily measure the body information of the wearer, and by acquiring the body information, it is possible to adjust the first lens and the display source according to body conditions depending on the wearer.

According to an embodiment of the present invention, the control unit 163 may calculate the predetermined position of the first lens and/or the display source on the basis of the acquired body information. Specifically, when the calculated result obtained by analyzing the body information acquired by the sensor unit 161 indicates that the field of view of the wearer is to be narrowed or widened, the control unit 163 may adjust the positions of the first lens and the display source to maximally secure the field of view of the wearer.

According to an embodiment of the present invention, the operation unit 165 may be disposed on the lateral side of the eye of the wearer and may move the position of the first lens and/or the display source to the predetermined position. Specifically, when the control unit 163 determines the position according to the body information of the wearer, the operation unit 165 may move the position of the first lens and/or the display source to adjust the distance L1 between the holographic optical element 130 and the first lens 120 and/or the distance L2 between the first lens 120 and the display source 110, thereby maximally securing the field of view according to the wearer.

According to an embodiment of the present invention, the display source 110 may receive an electrical signal having image information and output image display light for the image information. The display source 110 may be a small display panel capable of displaying an image. For example, the display source 110 may include a liquid crystal display (LCD) panel or a display panel composed of organic light emitting diodes (OLEDs).

According to an embodiment of the present invention, the first lens 120 serves to condense the image display light emitted from the display source 110. The display source 110 and the first lens 120 may be arranged such that the image display light emitted from the display source 110 is directly directed toward the first lens 120.

According to an embodiment of the present invention, the holographic optical element 130 may direct the image display light passing through the first lens 120 toward the eye 10 of the wearer of the head mounted display 100. That is, the image display light passing through the first lens 120 may be incident at a predetermined angle with respect to the normal line of the holographic optical element 130, reflected at an angle other than a reflection angle having the same angle, and directed toward the eye of the wearer. The holographic optical element 130 may be a reflective holographic optical element 130 designed to diffract image display light incident at a certain angle in a direction designed in advance, that is, a direction in which the eye of the wearer is located.

In an embodiment of the present invention, the head mounted display 100 may be implemented in the form of eyeglasses. The head mounted display 100 according to an embodiment may further include an eyeglass lens disposed in front of the eye of the wearer, that is, a second lens 150. In such a case, the display source 110 and the first lens 120 may be formed inside the eyeglass temple (not illustrated) so that the display source 110 and the first lens 120 are disposed on the lateral side of the eye 10 of the wearer, and one surface of the second lens 150 may be coated with the holographic optical element 130 in the form of a film. The holographic optical element 130 may be formed on one surface of the second lens 150 on the eye side of the wearer, or may be formed on the other surface of the second lens 150 onto which light emitted from the outside is incident. In the illustrated embodiment, the eyeglass lens, that is, the second lens has a flat shape; however, the present invention is not limited thereto and the second lens may have a curved shape or a pair of left and right second lenses (eyeglass lenses) may be formed to have optical axes, which are not parallel with each other, according to the shape of an eyeglass frame.

In the head mounted display 100 according to an embodiment of the present invention, the display source 110 and the first lens 120 may be formed inside the eyeglass temple (not illustrated) so that the display source 110 and the first lens 120 are disposed on the lateral side of the eye 10 of the wearer, and the holographic optical element 130 may be formed on one surface of the second lens 150. In such a case, image display light emitted from the display source 110 may be condensed while passing through the first lens 120, and the image display light passing through the first lens 120 may be obliquely incident onto the holographic optical element 130 at a predetermined angle and then diffracted and incident onto the eye 10 of the wearer. Accordingly, the head mounted display 100 in the form of eyeglasses according to an embodiment of the present invention may transfer an image including certain information to the eye 10 of the wearer.

In the head mounted display 100 according to an embodiment of the present invention, the holographic optical element 130 is formed on the second lens 150. Therefore, the head mounted display 100 may be configured to allow external light, which is incident from the other surface of the second lens 150 and passes through the second lens 150 and/or the holographic optical element 130, and image display light, which is emitted from the display source 110 formed on the eyeglass temple and is diffracted by the holographic optical element 130, to be simultaneously incident onto the eye 10 of the wearer.

The head mounted display 100 according to an embodiment of the present invention may have a bilaterally symmetrical structure in order to transfer image information to both eyes of the wearer. The illustrated embodiment is configured to transfer the image display light to the right eye of the wearer; however, the present invention is not limited thereto and the head mounted display 100 may further include the display source, the first lens, the holographic optical element, and the controller, which are provided on the left eyeglass temple and the left eyeglass lens (second lens) so as to transfer the image display light to the left eye of the wearer. Furthermore, the head mounted display 100 may also be implemented in the form of goggles or a helmet as well as eyeglasses.

Figure 2:
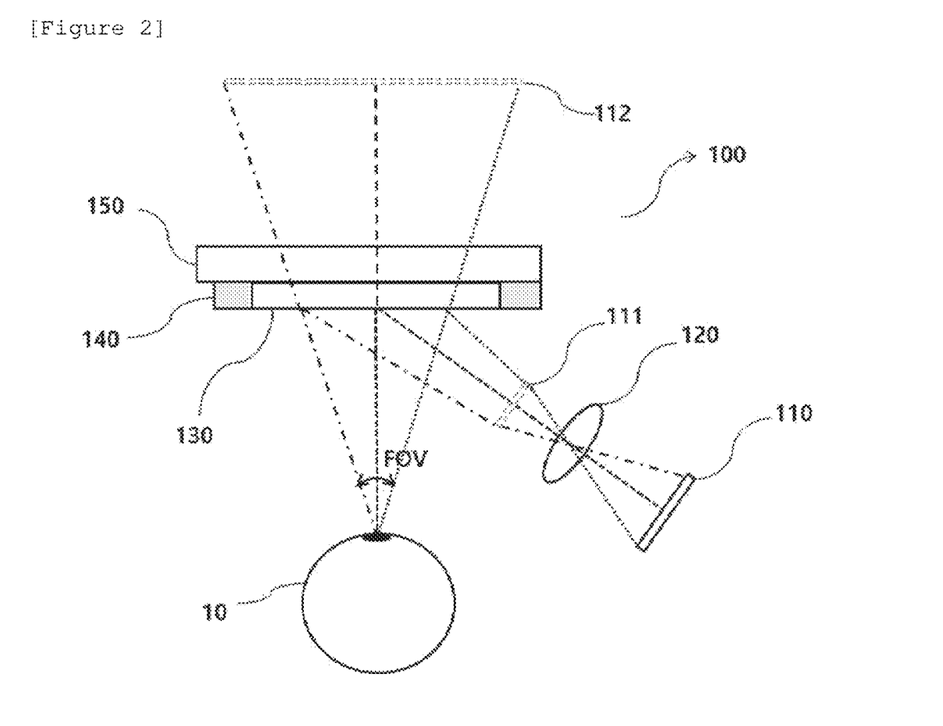
FIG. 2 is a view for explaining a field of view implemented by the head mounted display according to an embodiment of the present invention.

FIG. 2 is a view for explaining a field of view implemented by the head mounted display according to an embodiment of the present invention. According to an embodiment of the present invention, the display source 110 may be a small rectangular display panel and emit image display light including image information from each point of the rectangle. Referring to FIG. 2, the image display light emitted from the display source 110 may form an intermediate image 111 for an image while passing through the first lens 120. Light emitted from the intermediate image 111 for an image may be diffracted by the holographic optical element 130 and directed toward the eye 10 of the wearer, thereby forming a virtual image 112 for the intermediate image. The virtual image 112 formed by the holographic optical element 130 and the first lens 120 displays the image information included in the image display light emitted from the display source 110 to the wearer who wears the head mounted display 100.

At this time, the field of view (FOV) may be represented by expressing, as an angle, the size of an area, where the virtual image formed by the image display light emitted from each point of the display source 110 can be observed at a time by the eyes of the wearer, and the like.

According to an embodiment of the present invention, the first lens 120 is disposed on an optical path of the image display light between the display source 110 and the holographic optical element 130 and forms the intermediate image 111 of the image display light. Therefore, such a configuration may provide the effect that looks as if the display source 110 emits the image display light at a position where the intermediate image 111 is formed, and may extend the field of view for a virtual image finally formed by the holographic optical element. More specifically, according to various embodiments, when the first lens is inserted and disposed between the display source 110 and the holographic optical element 130, the field of view may be extended three times or more compared to a comparative example with no first lens.

Figure 3:
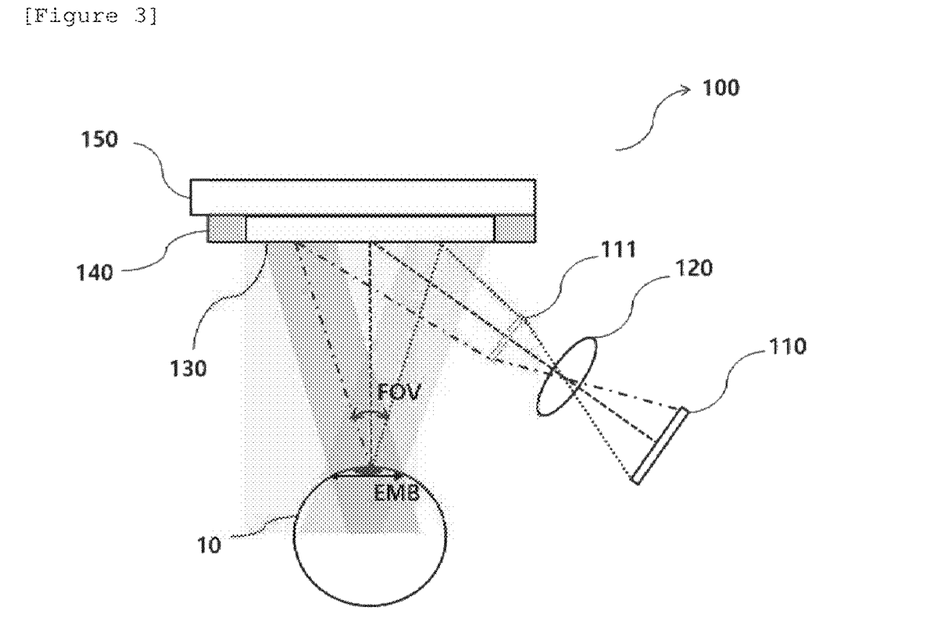
FIG. 3 is a view for explaining an eye motion box implemented by the head mounted display according to an embodiment of the present invention.

FIG. 3 is a view for explaining an eye motion box implemented by the head mounted display according to an embodiment of the present invention. Specifically, FIG. 3 illustrates, using shades, optical paths, through which image display lights emitted from both ends and the center of the display source 110 are incident onto the eye of the wearer, and ranges in which the image display lights incident onto the eye from the respective optical paths can be incident. Referring to FIG. 3, the image display light emitted from the center of the display source 110 may be incident onto the eye of the wearer within an incident range (illustrated in shades) parallel with the visual axis of the eye of the wearer, and the image display light emitted from both ends of the display source 110 may be incident within a predetermined incident range (illustrated in shades) parallel with a direction inclined left and right at a certain angle (for example, a half of the field of view) with respect to the visual axis of the eye of the wearer. In such a case, a portion where the incident ranges of the image display lights emitted from both ends and the center of the display source 110 overlap each other may be referred to as an eye motion box (EMB).

In the present specification, the eye motion box (EMB) may be defined as an area where an implemented image can be visually recognized. That is, only when the eye of the wearer may be disposed within the eye motion box formed by the optical system constituting the head mounted display, the wearer can correctly recognize an image to be transferred through the head mounted display. Accordingly, only when an eye motion box having a certain level or more is secured, a visual axis, which may vary depending on a distance between the head and eyes of the wearer, may be formed in the eye motion box, and only when the visual axis of the wearer is formed in the eye motion box, it is possible to implement an image to be transferred through the head mounted display.

In the head mounted display 100 according to an embodiment of the present invention, the first lens 120 is disposed between the display source 110 and the holographic optical element 130. Therefore, the size of the eye motion box is somewhat reduced compared to when only the first lens is not provided. However, the head mounted display 100 can secure an eye motion box having a certain level (for example, 10 mm×10 mm) or more for providing an image and extend the field of view.

MODE FOR INVENTION

FIG. 4 is a view for explaining a physical structure of an optical system included in head mounted displays according to various embodiments. FIG. 4 illustrates that the holographic optical element 130 is replaced with one virtual lens 131 such that an optical path bent due to an optical action (for example, diffraction) of the holographic optical element 130 in any one of FIG. 1 to FIG. is unfolded and is arranged on the same line as a straight line formed by the display source, the first lens, and the eye or visual axis of the wearer. In the illustrated structure in which the holographic optical element 130 is replaced with one virtual lens 131, it is possible to derive appropriate focal lengths the first lens 120 and the holographic optical element 130 according to the size of the display source 110 and optical characteristics to be recorded on the first lens 120 and the holographic optical element 130.

Referring to (a) and (b) of FIG. 4, assuming that the off-axis reflective structure of the holographic optical element 130 in FIG. 1 to FIG. 3 is unfolded and the display source 110, the first lens 120, and the eye 10 of the wearer are located on the same straight line, it is possible to derive a focal length FL2 of the first lens 120 and optical characteristics (for example, a focal length FL1 of the holographic optical element or a half R1 of the size of the holographic optical element) to be recorded on the holographic optical element 130.

In an embodiment of the present invention, assuming that the display source 110 is a rectangular display panel having a width of about 10 mm and a height of about 7 mm, the field of view (FOV) is derived by Formula 1 below.

$$FOV = 2 \times \tan^{-1} R1/ER \qquad \text{Formula 1}$$

In Formula 1 above, FOV denotes a field of view at which a virtual image of an image can be seen at a time through the eye of a wearer, ER denotes a linear distance between the eye 10 and the holographic optical element 130, and R1 denotes a half of the size of the holographic optical element 130. R1 can be obtained through Formula 1 above, and twice R1 is a minimum size of the holographic optical element to be recorded in order to implement the FOV.

$$R1 = ER \times \tan FOV/2 \qquad \text{Formula 2}$$

Through Formula 2 above, it is possible to derive the minimum size (twice R1) of the holographic optical element to be recorded, through ER, which is the distance between the holographic optical element 130 and the eye 10, and a target field of view (FOV).

Through the light illustrated in (a) of FIG. 4, Formula 3 below may be obtained.

$$L1/2R1=(PD-L1)/PS \quad \text{Formula 3}$$

In Formula 3 above, L1 denotes a distance between the first lens 120 and the virtual lens 131, L2 denotes a distance between the first lens 120 and the display source 110, PD denotes a distance (L1+L2) between the virtual lens 131 and the display source 110, and PS denotes a horizontal distance of the display source 110.

Through Formula 3 above, the distance between the first lens 120 and the virtual lens 131 may be derived as L1=PD/{(1+PS)/2·R1}, and the distance between the first lens 120 and the display source 110 may be derived as L2=PD−L1.

Furthermore, when FL1 denotes the focal length of the virtual lens 131 and FL2 denotes the focal length of the first lens 120, Formulas 4 and 5 below may be obtained by putting them into the lens formula.

$$1/FL1=1/L1+1/ER \quad \text{Formula 4}$$

$$1/FL2=1/L1+1/L2 \quad \text{Formula 5}$$

Through Formulas 4 and 5 above, the focal length FL1 to be recorded on the holographic optical element 130 and the focal length FL2 of the first lens 120, which is additionally disposed between the display source 110 and the holographic optical element 130 in order to extend the field of view, may be derived by Formulas 6 and 7 below.

$$FL1=ER \times L1/ER+L1 \quad \text{Formula 6}$$

$$FL2=(L1-FL1)ER \times L2/(PD-FL1) \quad \text{Formula 7}$$

In an embodiment of the present invention, referring to Table 1 below, under the condition that the linear distance ER between the eye 10 of the wearer and the holographic optical element 130 is set to 21.0 mm, the distance PD (L1+L2) between the virtual lens 131 and the display source 110 is set to 60.0 mm, the horizontal distance PS of the display source 110 is set to 10.0 mm, and the field of view (FOV) is set to 35.0°, the half R1 of the minimum size of the holographic optical element, the distance L1 between the first lens 120 and the virtual lens 131, the distance L2 between the first lens 120 and the display source 110, the focal length FL1 to be recorded on the holographic optical element 130, and the focal length FL2 of the first lens 120, which is additionally disposed between the display source 110 and the holographic optical element 130 in order to extend the field of view, may be derived as shown in Table 1 below through Formulas 1 to 5 above. The components set to have the derived five values may be included in a head mounted display to display an image.

That is, it is possible to implement a head mounted display in which the focal length to be recorded on the holographic optical element 130 is about 13 mm, the focal length of the first lens 120 is about 11 mm, the distance L1 between the first lens 120 and the holographic optical element 130 is about 35 mm, and the distance L2 between the first lens 120 and the display source 110 is about 25 mm.

TABLE 1

| ER (mm) | FD (mm) | PS (mm) | FOV (°) | R1 (mm) | L1 (mm) | L2 (mm) | FL1 (mm) | FL2 (mm) |
|---|---|---|---|---|---|---|---|---|
| 21.0 | 60.0 | 10.0 | 35.0 | 6.62 | 34.19 | 25.81 | 13.01 | 11.63 |

Figure 5:
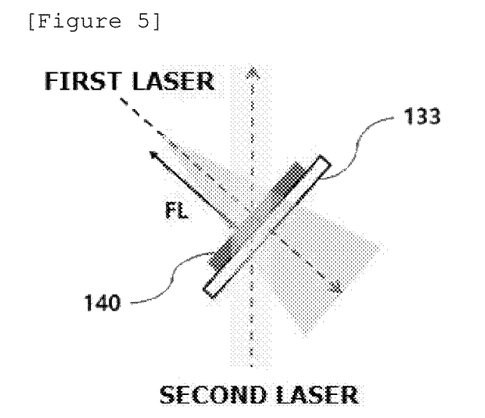
FIG. 5 is an exemplary view for explaining the manufacturing of a holographic optical element included in the head mounted display according to an embodiment of the present invention.
Figure 6:
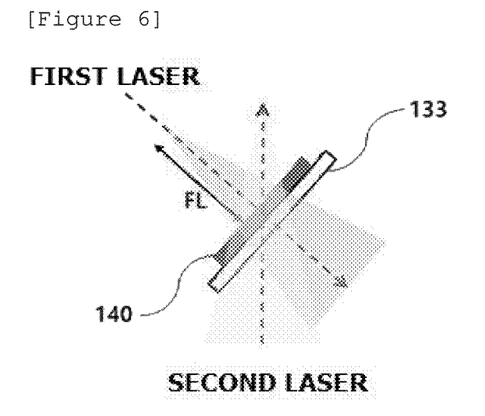
FIG. 6 is another exemplary view for explaining the manufacturing of a holographic optical element included in the head mounted display according to an embodiment of the present invention.

Referring to FIG. 1, the head mounted display 100 according to an embodiment of the present invention may be implemented in the form of eyeglasses, the display source 110 and the first lens 120 may be formed inside the eyeglass temple (not illustrated) so that the display source 110 and the first lens 120 are disposed on the lateral side of the eye 10 of the wearer, and one surface of the eyeglass lens (second lens) 150, which is disposed in front of the eye 10 of the wearer, may be coated with the holographic optical element 130 in the form of a film. The image display light from the display source 110 may be incident at an angle of θ with respect to the normal line of the holographic optical element 130 or the visual axis of the eye of the wearer, may be diffracted by the holographic optical element 130, and may be incident onto the eye of the wearer in parallel with the normal line of the holographic optical element 130 or the visual axis of the eye of the wearer. For example, in the structure in which the display source 110, the first lens 120, the holographic optical element 130 are included in eyeglasses, θ may be about 50°. Furthermore, the lens 120 may have a focal length of about 10 mm and an aperture of about 10 mm. Furthermore, the holographic optical element 130 may have a size of about 20 mm to about 40 mm that may be formed on the second lens. FIG. 5 is an exemplary view for explaining the manufacturing of the holographic optical element included in the head mounted display according to an embodiment of the present invention. FIG. 6 is another exemplary view for explaining the manufacturing of the holographic optical element included in the head mounted display according to an embodiment of the present invention.

According to an embodiment of the present invention, the holographic optical element 130 may be manufactured to have diffraction efficiency in which light incident at a predetermined angle with respect to the normal line of the holographic optical element is reflected at another angle other than the reflection angle having the same angle. Specifically, the holographic optical element may be manufactured to have diffraction efficiency in which light incident at 50° with respect to the normal line is reflected at 0° with respect to the normal line.

According to an embodiment of the present invention, the holographic optical element 130 may be manufactured to have a minimum size derived through the above Formulas described with reference to FIG. 4.

According to an embodiment of the present invention, the holographic optical element 130 may be manufactured such that the focal length FL1 derived through the above Formula described with reference to FIG. 4 is recorded thereon.

According to an embodiment of the present invention, the sensor unit 161 may be provided outside the controller. Specifically, the sensor unit 161 may be located on an eyeglass frame other than an eyeglass temple. As described above, the sensor unit 161 is provided outside the controller, so that it is possible to simplify the structure of the head mounted display and accurately acquire the body information of the wearer.

According to an embodiment of the present invention, the sensor unit 161 may be provided inside the eyeglass frame. Specifically, the sensor unit 161 may be located inside the eyeglass frame disposed in front of the eye of the wearer and located toward the eye of the wearer. As described above, the sensor unit 161 is provided toward the eye of the wearer inside the eyeglass frame located in front of the eye of the wearer, so that it is possible to accurately measure and/or acquire the body information of the wearer.

According to an embodiment of the present invention, the control unit 163 and/or the operation unit 165 may be located inside the eyeglass temple. As described above, the control unit 163 and/or the operation unit 165 are/is provided inside the eyeglass temple corresponding to the lateral side of the eye of the wearer, so that it is possible to simplify the structure of the head mounted display and reduce the weight of the head mounted display.

According to an embodiment of the present invention, the body information may be one selected from the group consisting of the shape of the head of the wearer, the position of the eye of the wearer, a distance between both eyes of the wearer, and a combination thereof. Specifically, the body information acquired by the sensor unit 161 may be one selected from the group consisting of the shape of the head of the wearer, the position of the eye of the wearer, a distance between both eyes of the wearer, and a combination thereof, and may all be acquired when they correspond to information required to extend the field of view of the wearer. More specifically, the body information may include the size of the pupil of the wearer, a state in which the diaphragm of the wearer has been closed, a depth at which the eyeball has been depressed at a skeleton around the eye of the wearer, and the like. By adjusting the distance L1 between the holographic optical element 130 and the first lens 120 and/or the distance L2 between the first lens 120 and the display source 110 according to the body information, it is possible to maximally secure the field of view on the basis of the body information that varies depending on a wearer.

According to an embodiment of the present invention, the control unit 163 may calculate predetermined positions of the first lens and the display source so as to satisfy a target field of view of the eye of the wearer for the image. Specifically, the control unit 163 may calculate the predetermined positions of the first lens and the display source on the basis of the acquired body information of the wearer and the operation unit 165 may adjust the positions of the first lens and the display source, so that it is possible to maximally secure the field of view, on the basis of the body information that varies depending on a wearer, by adjusting the distance L1 between the holographic optical element 130 and the first lens 120 and/or the distance L2 between the first lens 120 and the display source 110.

Referring to FIG. 5 and FIG. 6, the holographic optical element 130 according to various embodiments may be manufactured by disposing a photosensitive material 140 on a transparent substrate 133 (for example, glass, plastic, or eyeglass lens) and recording an interference pattern on the photosensitive material by using two coherent laser beams emitted to the front and rear surfaces of the photosensitive material at a predetermined angle. As illustrated in FIG. 5 and FIG. 6, the interference pattern may be formed in an area where the silhouette (indicated in shades) of a first laser beam and the silhouette (indicated in shades) of a second laser beam overlap each other on the photosensitive material, and the size of the holographic optical element may be determined by the overlapping area. Furthermore, when the first lens 120 is added as described above with reference to FIG. 4, the focal length FL1 to be recorded on the holographic optical element 130 is calculated and a vertical distance between a point where the first laser beam starts to spread and the photosensitive material 140 is set as the calculated focal length FL1, so that the focal length FL1 may be recorded on the holographic optical element.

Referring to FIG. 5, in order to manufacture a holographic optical element having a focal length calculated when the first lens 120 is added, a first laser emits a cone-shaped beam that starts to spread at a point spaced apart from one surface of the photosensitive material 140 by the focal length in a vertical direction. At this time, a second laser emits a cylindrical beam toward the other surface of the photosensitive material 140. An area of the photosensitive material 140, where the interference pattern is formed by the interaction of the first laser beam and the second laser beam, may be the holographic optical element, and determines the size of the holographic optical element. In such a case, the thickness and the exposure time of the photosensitive material 140 are recorded differently, so that a holographic optical element having maximum diffraction efficiency may be manufactured.

Referring to FIG. 6, in order to manufacture a holographic optical element having a short focal length due to a short focal length calculated when the first lens 120 is added, it is possible to use a method in which the first laser emits a cone-shaped beam that starts to spread at a point spaced apart from one surface of the photosensitive material 140 by the focal length in a vertical direction, and the second laser emits a cone-shaped beam, which travels while being condensed, toward the other surface of the photosensitive material 140. An area of the photosensitive material 140, where the interference pattern is formed by the interaction of the first laser beam and the second laser beam, may be the holographic optical element, and determines the size of the holographic optical element. In such a case, the thickness and the exposure time of the photosensitive material 140 are recorded differently, so that a holographic optical element having maximum diffraction efficiency may be manufactured.

Although the present invention has been described in relation to the preferred embodiment described above, various corrections or modifications can be made without departing from the subject matter and scope of the disclosure. Therefore, the appended claims will include such corrections or modifications as long as they belong to the subject matter of the present invention.

The invention claimed is:

1. A head mounted display configured to be worn on a head of a wearer to transfer an image, the head mounted display comprising:
    a display source disposed on a lateral side of an eye of the wearer and configured to output an image display light;
    a first lens configured to condense the image display light;
    a holographic optical element (HOE) disposed in front of the eye of the wearer and configured to direct the image display light passing through the first lens toward the eye of the wearer; and
    a controller configured to adjust at least one of: a position of the display source; or a position of the first lens, the controller comprising a sensor unit disposed in front of the eye of the wearer and configured to acquire body information of the wearer, and a control unit configured to calculate predetermined positions of the first lens and the display source based on the body information,
    wherein the body information is one selected from the group consisting of: a shape of the head of the wearer, a distance between both eyes of the wearer, or a combination thereof.

2. The head mounted display according to claim 1, wherein the controller further comprises:
    an operation unit disposed on the lateral side of the eye of the wearer and configured to move the positions of the first lens and the display source to the predetermined positions.

3. The head mounted display according to claim 2, wherein the sensor unit is located inside an eyeglass frame, and the control unit and the operation unit are located inside an eyeglass temple.

4. The head mounted display according to claim 2, wherein the control unit calculates the predetermined positions of the first lens and the display source so as to satisfy a target field of view of the eye of the wearer for the image.

5. The head mounted display according to claim 1, wherein the display source includes a liquid crystal display panel or an organic light emitting diode display panel.

6. The head mounted display according to claim 1, further comprising:
   a second lens disposed in front of the eye of the wearer and having the holographic optical element formed on one surface thereof.

7. The head mounted display according to claim 6, wherein the head mounted display is configured to receive external light passing through at least one of the second lens and the holographic optical element, so that the external light becomes incident onto the eye of the wearer from a front surface facing the eye of the wearer.

8. The head mounted display according to claim 6, wherein the display source, the first lens, the second lens, and the controller are installed on at least one of eyeglasses, goggles, or a helmet.

9. The head mounted display according to claim 8, wherein a pair of left and right display sources each including the display source are provided to correspond to both eyes of the wearer, respectively, a pair of left and right first lenses each including the first lens are provided to correspond to both eyes of the wearer, respectively, a pair of left and right second lenses each including the second lens are provided to correspond to both eyes of the wearer, respectively, and a pair of left and right controllers each including the controller are provided to correspond to both eyes of the wearer, respectively.

10. The head mounted display according to claim 8, wherein the display source and the first lens are disposed inside an eyeglass temple so that the image display light from the display source is obliquely incident at a predetermined angle with respect to a normal line of the holographic optical element.

11. The head mounted display according to claim 1, wherein the first lens has a focal length calculated to satisfy a target field of view of the eye of the wearer for the image.

12. The head mounted display according to claim 1, wherein, a focal length calculated to satisfy a target field of view of the eye of the wearer for the image is recorded on the holographic optical element.

* * * * *